(No Model.)

J. DANIELS.
OPEN RING.

No. 382,953. Patented May 15, 1888.

Witnesses.
Wm. M. Monroe.
Irene L. Corey.

Inventor,
Joseph Daniels,
by
H. J. Fisher
Attorney.

N. PETERS, Photo-Lithographer, Washington, D. C.

UNITED STATES PATENT OFFICE.

JOSEPH DANIELS, OF CLEVELAND, OHIO.

OPEN RING.

SPECIFICATION forming part of Letters Patent No. 382,953, dated May 15, 1888.

Application filed October 31, 1887. Serial No. 253,840. (No model.)

*To all whom it may concern:*

Be it known that I, JOSEPH DANIELS, a citizen of the United States, residing at Cleveland, in the county of Cuyahoga and State of Ohio, have invented certain new and useful Improvements in Open Rings; and I do hereby declare that the following is a full, clear, and exact description of the invention, which will enable others skilled in the art to which it appertains to make and use the same.

My invention relates to open rings the ends of which overlap each other; and it consists in the construction of a ring having the form and function of the ring here shown and described, and particularly pointed out in the claims.

Figure 2:
Figure 1:
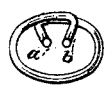
Figure 3:
Figure 4:
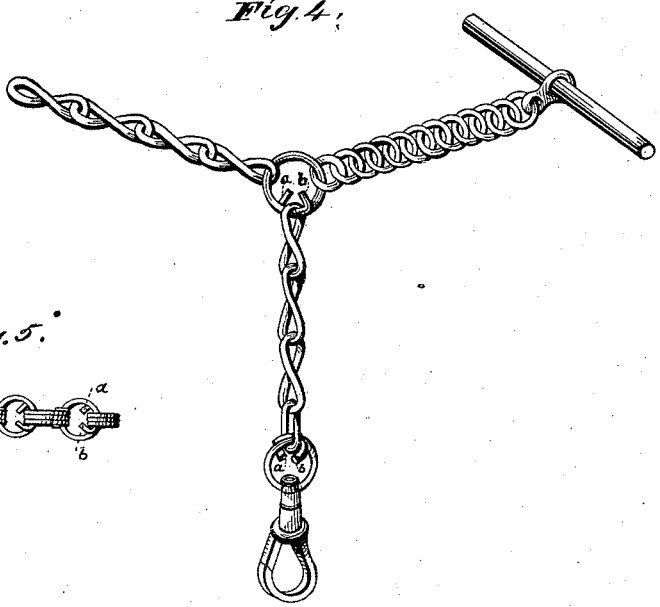
Figure 5:
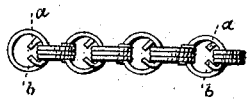

In the accompanying drawings, Figure 1 is a plain elevation of a ring embodying my invention. Fig. 2 is a perspective view thereof, and Fig. 3 an edge view. Fig. 4 shows two uses of the ring on a watch-chain. Fig. 5 shows a section of a chain of open links fashioned according to my invention.

The construction of my improved ring will readily be understood from the drawings accompanying and forming a part of the specification. It is an open ring having its ends overlapping somewhat, as shown, and bent inward, as seen at *a b*. The bends in the ends of the ring are made uniform in length and project toward each other, with sufficient space between them at their base to give free play to a link or ring that may be introduced between said ends. In Figs. 1 and 2 I show the rings as originally formed and ready for use. Then when placed in a chain or the like position the links or rings with which they are connected are introduced between the bent ends *a b*, when said ends may be pressed together, or nearly so, at their points, and thereby the link will be confined and cannot escape. The space between the ends will be sufficient to give the link or ring all needed play, while at the same time the connection is very greatly strengthened and the ring is closed against possibility of opening by accident, thus making the connection, when this kind of ring is employed, absolutely secure, as well as giving it much more strength than it would have without the bent and locked ends.

The points need not be sprung entirely to effectually confine a link between them, and the ring may be employed to suspend charms on a watch-chain or in any other part of such a chain when an open link is needed, and it may also be used in other and larger chains, the position or use not being material.

In Fig. 5 I show a section of chain composed of rings, each of which has its ends turned inward and clasps or holds the next adjoining ring in the series. In this case the rings are made double, so that at the point where they overlap they are of quadruple thickness.

Having thus described my invention, what I claim as new, and desire to secure by Letters Patent, is—

1. An open overlapping ring having its ends bent inward and provided with a free space at the angle of and between said bent ends, forming a seat for a ring or link, substantially as set forth.

2. An open ring formed of a single piece of metal, as gold wire, bent to overlap and having its ends turned sharply inward toward the center of the ring from different points of its overlapped portion, whereby an overlapped free space is formed at the angle of the bent ends to hold a link or the like, substantially as shown and described.

JOSEPH DANIELS.

Witnesses:
H. T. FISHER,
J. L. COREY.